US012741516B2

(12) United States Patent
Rockelmann et al.

(10) Patent No.: US 12,741,516 B2
(45) Date of Patent: Sep. 22, 2026

(54) ROLLER BLIND ARRANGEMENT AND VEHICLE ROOF

(71) Applicant: Webasto SE, Stockdorf (DE)

(72) Inventors: Andreas Rockelmann, Stockdorf (DE); Georg Rossmair, Stockdorf (DE); Tobias Mech, Stockdorf (DE)

(73) Assignee: WEBASTO SE, Stockdorf (DE)

(*) Notice: Subject to any disclaimer, the term of this patent is extended or adjusted under 35 U.S.C. 154(b) by 234 days.

(21) Appl. No.: 18/196,757

(22) Filed: May 12, 2023

(65) Prior Publication Data

US 2023/0364975 A1 Nov. 16, 2023

(30) Foreign Application Priority Data

May 16, 2022 (DE) ......................... 102022112196.8

(51) Int. Cl.
*B60J 7/00* (2006.01)

(52) U.S. Cl.
CPC .................................. *B60J 7/0015* (2013.01)

(58) Field of Classification Search
CPC ...... B60J 7/0007; B60J 7/0015; B60J 7/0023; B60J 7/043; B60J 1/2052; B60J 1/2063;
(Continued)

(56) References Cited

U.S. PATENT DOCUMENTS

2004/0040676 A1* 3/2004 Engl ...................... B60J 1/2052 160/370.22
2004/0068839 A1* 4/2004 Hock ......................... B60J 7/02 160/370.22

(Continued)

FOREIGN PATENT DOCUMENTS

CN 101992674 A 3/2011
CN 107000557 A 8/2017

(Continued)

OTHER PUBLICATIONS

Examination Report for Companion Application in Germany dated Dec. 5, 2022 (in German with machine translation—10 pages).

(Continued)

*Primary Examiner* — Abe Massad
*Assistant Examiner* — Matthew R. Shepherd
(74) *Attorney, Agent, or Firm* — Fitch, Even, Tabin & Flannery, LLP

(57) ABSTRACT

A roller blind arrangement for a vehicle roof of a motor vehicle, having a fixed glass element, two mutually opposite guide rails which extend along a longitudinal direction and are each curved such that a distance between the guide rails changes along the longitudinal direction, a roller blind web which is displaceably guided in the guide rails along the longitudinal direction, wherein a guide rail has a receiving channel for receiving part of the roller blind web, an insertion element is arranged on the fixed glass element and extends along the receiving channel, the roller blind web is guided between the receiving channel and the insertion element, wherein the insertion element has an extent which changes along the longitudinal direction such that a greater or lesser amount of the roller blind web is received in the receiving channel.

9 Claims, 5 Drawing Sheets

Figure 1:
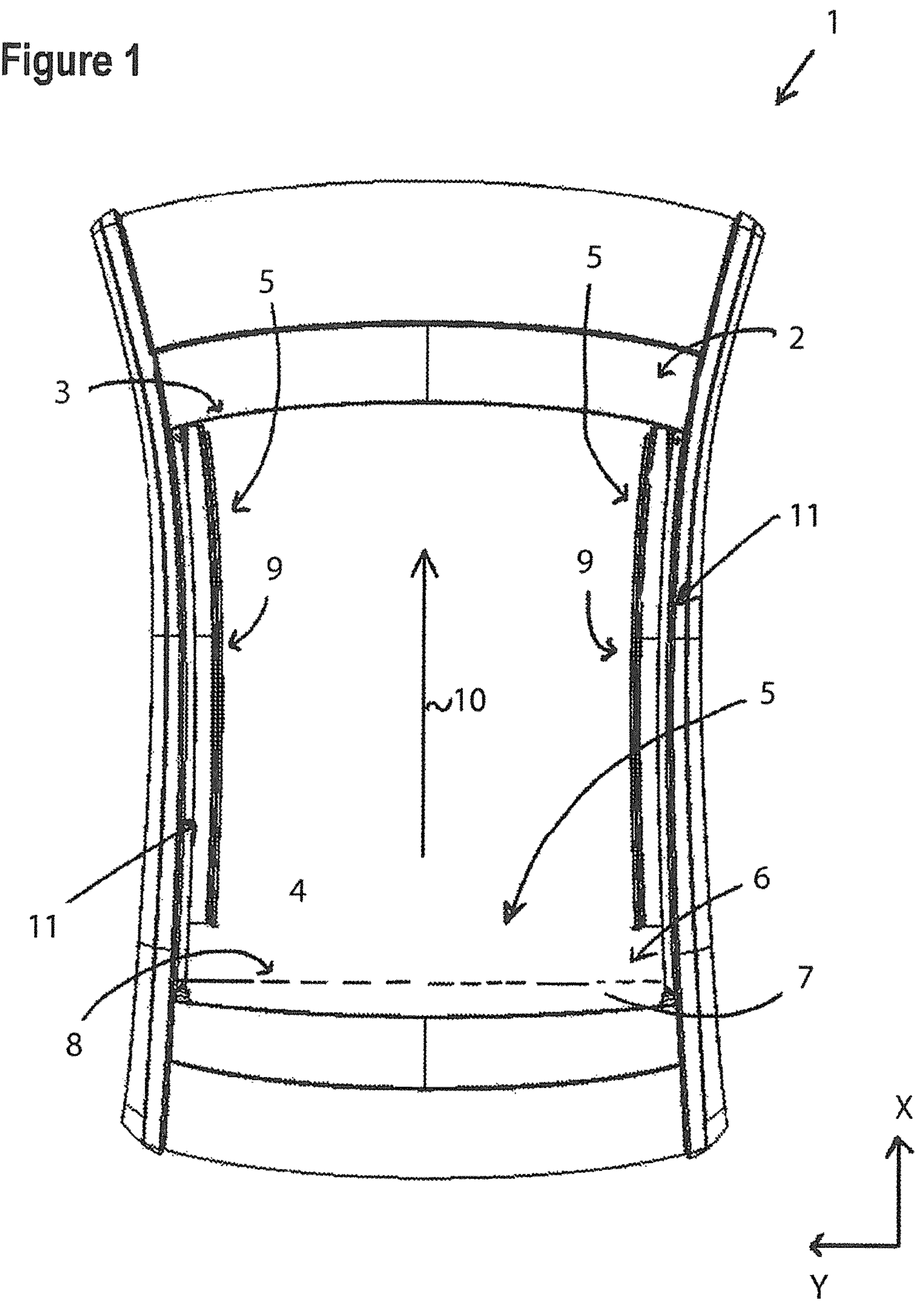

(58) Field of Classification Search
CPC ...... B60J 1/2036; B60J 1/2044; B60J 1/2013; B60J 1/2041
See application file for complete search history.

(56) References Cited

U.S. PATENT DOCUMENTS

2004/0232737 A1 11/2004 Hanke
2008/0179021 A1* 7/2008 Biewer .................. B60J 7/0007 160/266
2010/0032991 A1* 2/2010 Keller .................... B60J 7/0015 296/214
2010/0170645 A1* 7/2010 Lin ........................ B60J 7/0015 160/370
2011/0042996 A1 2/2011 Demma
2014/0224436 A1* 8/2014 Yukisada .................. E06B 9/42 160/267.1
2015/0091334 A1* 4/2015 Ohdoi ........................ B60J 7/05 296/221
2015/0108794 A1* 4/2015 Holzel ................... B60J 7/0007 296/214
2015/0175064 A1* 6/2015 Albert ...................... B60Q 3/66 362/511
2015/0298601 A1* 10/2015 Bott .................. B32B 17/10541 362/520
2016/0368353 A1* 12/2016 Clephas ................. B60J 7/0015
2017/0225549 A1 8/2017 Kanai
2017/0313168 A1* 11/2017 Hoelzel .................... B60J 7/043
2018/0339577 A1 11/2018 Adelmann
2019/0275871 A1* 9/2019 Schäufler ............... B60J 10/248

FOREIGN PATENT DOCUMENTS

CN 108944372 A 12/2018
CN 213167668 U 5/2021
DE 10146284 A1 4/2003
DE 102013207920 A1 10/2014
EP 3181385 A1 * 6/2017 ............ B60J 7/0015
KR 20140001188 A 1/2014

OTHER PUBLICATIONS

Office Action issued in corresponding Chinese Application No. 202310542083.6; mailed Feb. 25, 2026; In Chinese with English machine translation (14 pages).

* cited by examiner 1
5
5
2
3
11
9
9
10
5
6
4
11
7
8
X
Y

B
5
4a
4
16
19
4b
17
18
13
8
9
20

A
5
16
19
4
8
17
13
18
20
9
27
21

B
24
16
21
26
4
22
5
19
17
18
13
27
24
24
20
8
9
23
24

A
31
16
28
19
23
5
4
22
17
73
30
18
9
20
8
24
23

ROLLER BLIND ARRANGEMENT AND VEHICLE ROOF

CROSS-REFERENCE TO RELATED APPLICATION

This application claims priority from German Patent Application Number 10 2022 112 196.8, filed on May 16, 2022, which is hereby incorporated herein by reference in its entirety for all purposes.

FIELD

The invention concerns a roller blind arrangement and a vehicle roof.

BACKGROUND

In some motor vehicles, a roof opening is integrated in the vehicle roof and has a sliding roof system or fixed glass element in order for example to allow a clear view out of the motor vehicle. In the case of a sliding roof system, a cover is provided which can slide and/or be raised in order to allow not only a clear view but also if required an air exchange. In order to reduce a light incidence through such a glass cover when necessary, some motor vehicles have a sliding headlining system or roller blind arrangement. For example, document DE 10146284 A1 describes an opening vehicle roof. Here it is always a challenge to provide a compact and reliable function of interacting components of the shading system.

A constant trend in modern vehicles is to make roof openings ever larger, so that larger roof glazing elements and hence a increased visibility are possible. With such aims, the roof openings and corresponding glazing must be adapted to complex curvatures and shapes of the vehicle roof, in particular in the edge regions. This applies inter alia to shading systems, in particular roller blind arrangements, for such vehicle roofs which must also adapt to complex shapes in order to allow maximum visibility.

SUMMARY

An object on which the invention is based is to indicate a concept for a roller blind arrangement which helps achieve particularly good visibility through the roof from the inside without loss of function and reliability.

A roller blind arrangement for a vehicle roof of a motor vehicle is disclosed. The roller blind arrangement has a fixed glass element. The roller blind arrangement furthermore has two mutually opposite guide rails which extend along a longitudinal direction and are each curved such that a distance between the guide rails changes along the longitudinal direction. Furthermore, the roller blind arrangement has a roller blind web which is laterally displaceably guided in the guide rails along the longitudinal direction. A guide rail has a receiving channel for receiving part of the roller blind web. An insertion element is arranged on the fixed glass element and extends along the receiving channel. The roller blind web is guided between the receiving channel and the insertion element. The insertion element has an extent which changes along the longitudinal direction such that a greater or lesser amount of the roller blind web is received in the receiving channel.

SUMMARY

According to the invention, on at least one side of the fixed glass element, a guide rail with a receiving channel is provided in which the insertion element of the fixed glass element is arranged. This changes with respect to an extent along the longitudinal direction, such that a greater or lesser amount of the roller blind web, which is guided in the transverse direction between the receiving channel and the insertion element, is received in the receiving channel. The transverse direction is the direction transversely to the longitudinal direction, i.e. between the two guide rails. In other words, if the extent of the insertion element in the longitudinal direction is greater in one portion than in another, the roller blind web must cover more distance between the insertion element and the receiving channel. In yet other words, depending on position, the insertion element forces a greater or lesser amount of the roller blind web into the receiving channel.

This allows monitoring of a clear extent of the roller blind web (region of roller blind web between the opposite guide rails in the region visible to an occupant) between the guide rails in the longitudinal direction. In particular, it is possible to influence the transverse tension of the roller blind web (tension of roller blind web between the two guide rails, i.e. transversely to the longitudinal direction) along the guide rails. For guide rails for which the mutual spacing in the longitudinal direction changes, this allows the changed distances to be taken into account. Thus the extent of the insertion element in the longitudinal direction, in a region in which the guide rails are arranged closer together, is selected large enough for more roller blind web to be received in the receiving channel in this region. Secondly, the extent of the insertion element is selected comparatively smaller in a region in which a distance between the two guide rails is comparatively larger. In this way, it is possible to ensure a predefined transverse tension of the roller blind web over the entire length of the guide rails in the longitudinal direction.

Thus in a simple fashion, the solution according to the invention allows compensation for differing distances between the guide rails over their length, and ensures adequate transverse tension of the roller blind web and a reliable function. In other words, “surplus roller blind web” can be compensated, wherein the fabric tension is retained. In yet other words, a fabric width of the roller blind web is compensated by cooperation of the receiving channel and insertion element. Thus no special roller blind shape need be provided for the particular arrangement of the guide rails, but a comparatively simple rectangular shape can be used.

The invention in particular allows the guide rails to be adapted particularly precisely to the course of the roof contour and/or the outer edges of the vehicle roof. The see-through region for the fixed glass element is thus no longer necessarily rectangular because of parallel running guide rails, but can assume a course which is curved at the edges and thus offer maximum visibility. This also contributes to a better appearance. A side-guided roller blind web can be retained.

The specific design, with the insertion element and a receiving channel in which the insertion element can engage, contributes to taking up as little installation space as possible in the region of the guide rails.

In particular, the guide rail system requires little installation space in the Y and Z directions. This avoids collisions with other vehicle components, e.g. airbags. The clear view can be expanded to the glass edges of the fixed glass element. It also contributes to a cost reduction in that, for example, comparatively simply designed guide rails may be provided, which in particular can be foam-moulded onto the glass cover. Fabric width compensation by means of the insertion element and receiving channel constitutes a particularly simple structural design. The insertion element may for example also be foam-moulded onto the fixed glass element.

Furthermore, it is possible to use a double-glazing system for the fixed glass element, in which the roller blind system or roller blind arrangement is encapsulated between the two panes. Such a system is robust against environmental influences. Such a system allows a simple mounting concept in which, for example, the roller blind arrangement including the roller blind shaft with drive elements is pre-mounted in a frame part and assembled together with the roller blind web and the two panes.

The longitudinal direction may also be called the vehicle longitudinal direction or the deployment direction of the roller blind web.

The distance between the two guide rails is for example the clear distance, or the spacing of the guide channels for the roller blind web.

The fixed glass element is for example a transparent element which is fixedly integrated in the vehicle roof. The fixed glass element is designed not to be movable relative to the roof. In particular, it is a so-called panoramic roof.

The receiving channel is for example open at the top towards the pane. In other words, in a specific installation state of the roller blind arrangement, viewed from a vehicle interior, the receiving channel is open at the top towards the pane, while the insertion element extends downward from the fixed glass element. The receiving channel and correspondingly the insertion element extend in the longitudinal direction over the entire length or over a majority length of the guide rail. The receiving channel thus follows the curved path of the guide rails. In other words, the insertion element is an elongate element which is formed correspondingly to the receiving channel.

Here and below, the provision of the one immersion element and the one receiving channel on a corresponding guide rail on one side of the fixed glass element may also be repeated on the opposite side of the fixed glass element. In particular, it is preferred if the fixed glass element has an insertion element for the corresponding guide rail on each side, wherein the respective guide rail has a corresponding receiving channel. Thus the width of the roller blind web is compensated as described above on both sides and the transverse tension is ensured.

To guide the roller blind web, the guide rails each have a guide e.g. in the form of a guide rail channel, in which the roller blind web is displaceably guided. In particular, the roller blind web has a guide element for each guide. A guide element is for example a flat element which is arranged at the side edge region of the roller blind web and serves for sliding displacement thereof in the corresponding guide of the guide rail, such as the guide rail channel. The guide element is a lateral reinforcing element. For example, the guide element is flat and flexible so that it can be wound onto a winding shaft for winding up the roller blind web. The guide element extends in the longitudinal direction at the respective side edge region. For example, the guide element is a guide strip or side strip. The guide rail channel of the respective guide rail for lateral guidance of the roller blind web may also be described as a lateral guide. The respective guide element is guided by form fit so as to be slidingly displaceable in the guide. For example, the shaping and dimensioning of the guide and the respective guide element of the roller blind web are dimensioned such that the guide element cannot easily come out of the guide.

According to one embodiment, a width of the insertion element in the receiving channel changes. By changing the width and hence the thickness of the insertion element in the receiving channel, a greater or lesser amount of roller blind web is guided around the insertion element and received in the receiving channel. This contributes to laterally receiving a greater or lesser amount of roller blind web according to the spacing of the guide rails as described above, and ensures a reliable transverse tension of the roller blind web.

According to one embodiment, the extent of the insertion element changes such that the insertion element engages in the receiving channel over different amounts along the corresponding guide rail. Depending on how far the insertion element protrudes into the receiving channel, a greater or lesser amount of roller blind web is received in the receiving channel. In other words, this is a so-called tongue-and-groove principle. The insertion element around which the roller blind web is guided presses greater or lesser amounts of the roller blind web into the receiving channel depending on its extent, whereby with respect to the transverse direction, more or less roller blind web is guided between the receiving channel and the insertion element. The insertion element functions as a "blade" protruding downward from the fixed glass element with different lengths in the Z direction. This contributes to the above-mentioned advantages and functions.

According to one embodiment, the guide rails are configured and/or arranged such that they run non-parallel to one another. For example, the guide rails run obliquely to one another or have a single or multiple curve in their course. Thus the distance between the guide rails changes as described above.

According to one embodiment, the insertion element is connected to the fixed glass element by means of a foam moulding. In other words, the insertion element is foam-moulded onto the fixed glass element.

According to one embodiment, the guide rails together with the insertion element are connected to the fixed glass element by means of the foam moulding. In other words, the guide rails together with the insertion element are foam-moulded onto the fixed glass element.

Foam-moulding of the insertion element, the guide rails or both contributes to a substantial cost reduction for example. In particular, it is not necessary to mount the guide rails and insertion element or elements in complex fashion. In particular, the two elements may be directly connected to the fixed glass element in a foam-moulding process.

According to one embodiment, the roller blind web has a rectangular shape. This gives the above-mentioned advantages and functions.

According to one embodiment, the roller blind arrangement has a tension bow with an elongate tension bow body which is fixedly connected to the roller blind web and extends between the guide rails, wherein at one longitudinal end, the tension bow body has a guide element, by means of which the tension bow is guided displaceably along the longitudinal direction (in particular on the respective guide rail). The guide element is arranged on the tension bow body so as to be displaceable in the transverse direction between the guide rails. In this exemplary embodiment again, the tension bow body may have a corresponding guide element on both sides.

In this way, a tension bow is possible which is formed so as to be displaceable in the transverse direction relative to the guide element or elements. The tension bow is hence displaceable in the transverse direction in order to compensate for different spacings of the guide rails along the longitudinal direction. The tension bow body moves relative to the guide element depending on whether more or less roller blind web is received laterally in the receiving channel.

According to one embodiment, the guide element (or guide elements) of the tension bow is displaceably guided in the corresponding guide rail and coupled to a drive. For example, the guide element is coupled in the guide rail to a compression-resistant drive cable in order to actuate the tension bow and deploy or retract the roller blind web. Like the roller blind web, the guide element is for example guided towards the outside between the insertion element and the receiving channel, in order to be displaceably guided relative to the transverse direction outwardly into the guide rail outside the insertion element. For example, the guide element is guided around the insertion element in the receiving channel. For example, the guide element is a metal strip or a metal element which is formed particularly flat and is guided in the receiving channel so as to line this as far as possible. The described guide element is thus a guide element which is coupled directly in the guide rail and displaceably guided.

According to another embodiment, the guide element is provided with a magnetic element which is magnetically coupled to a drive element which is displaceable in the guide rail. In this case, the guide element of the tension bow is indirectly magnetically driven. This has the advantage that the guide element need not be guided in the receiving channel, as described above, in order to reach the corresponding guide rail channel of the guide rail. The guide element with the magnetic element may thus be arranged on the inside, i.e. on the side of the insertion element facing inward, while the corresponding drive element for the roller blind web is arranged on the outside, on the other side of the insertion element, and is magnetically coupled to the guide element. Such a concept offers advantages with respect to ease of mounting and installation space, since in particular no guide element need be received in the receiving channel in addition to the roller blind web.

According to a further aspect, a vehicle roof for a motor vehicle is described which has a roller blind arrangement according to one of the above-described embodiments, wherein the roller blind arrangement is fixedly connected to the vehicle roof. In particular, the roller blind arrangement with the fixed glass element is mounted in a roof opening of the vehicle roof. The vehicle roof allows substantially the above-mentioned advantages and functions. The above-described features, embodiments and similar apply accordingly.

BRIEF DESCRIPTIONS OF THE DRAWINGS

Further advantages, features and refinements arise from the following exemplary embodiments which are explained in connection with the figures. Elements of the same design or function are identified with the same reference signs across all figures.

Figures 2, 3:
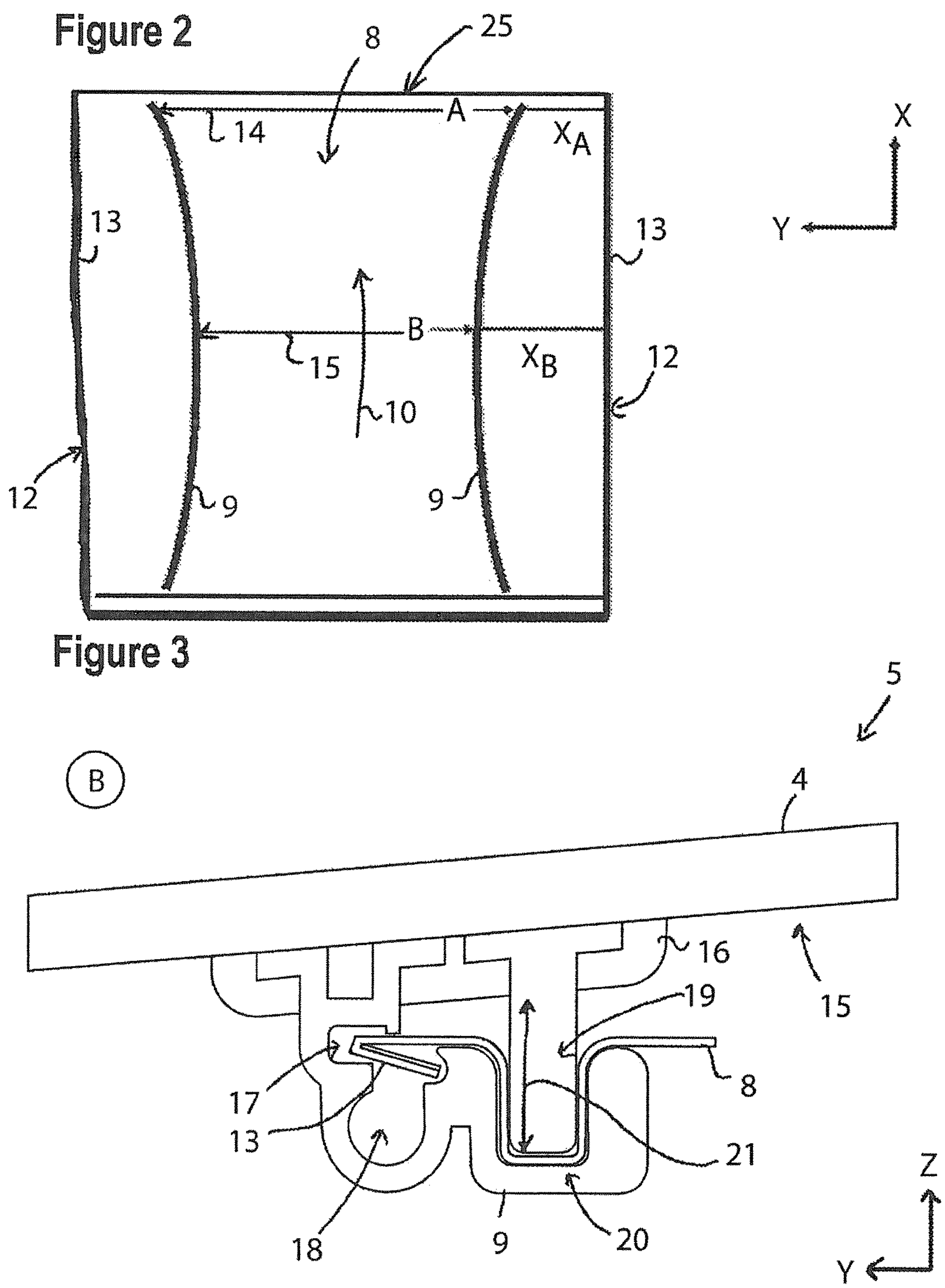
Figures 4, 5:
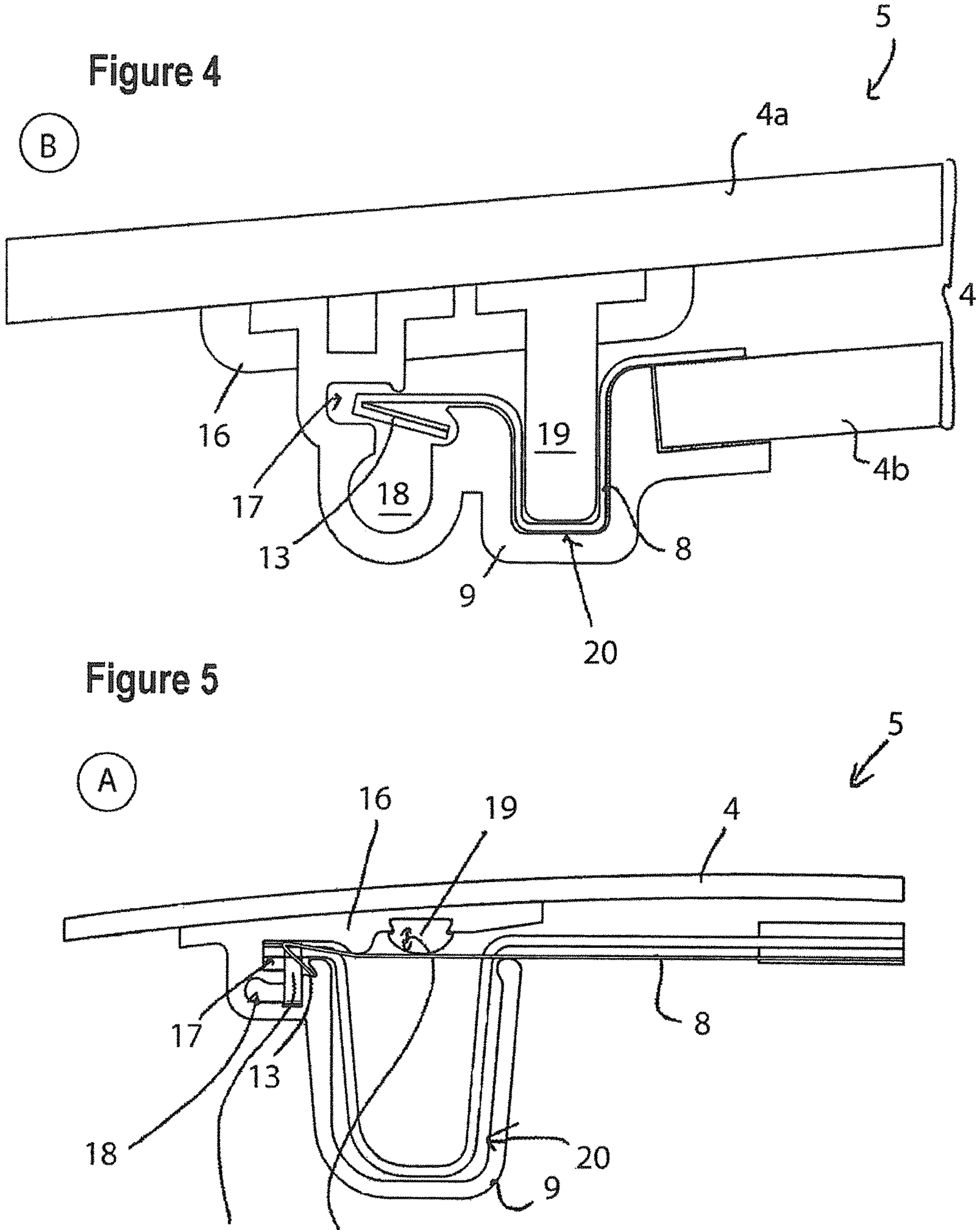
Figure 6:
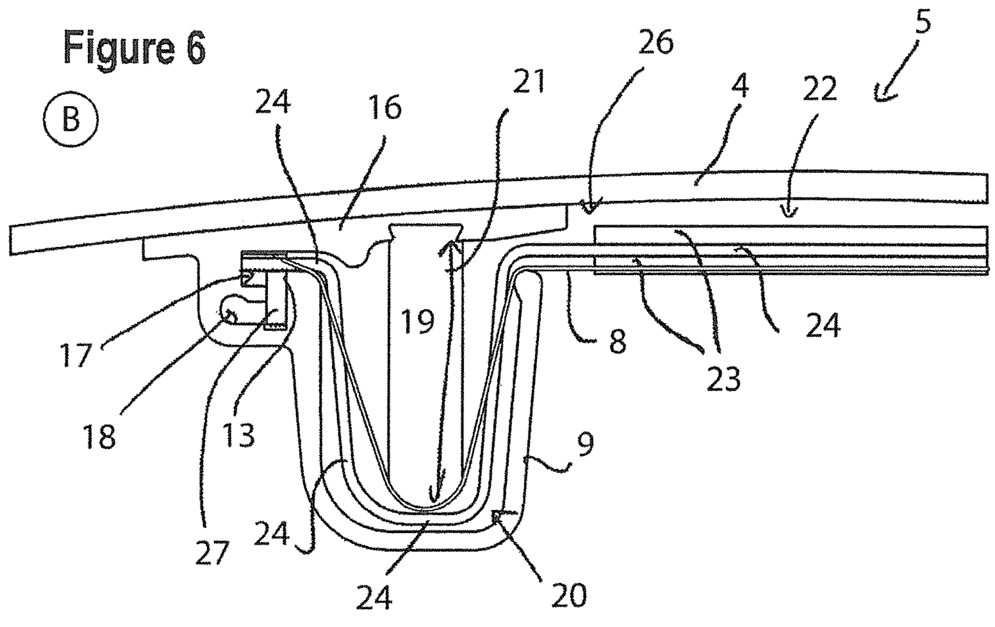
Figure 7:
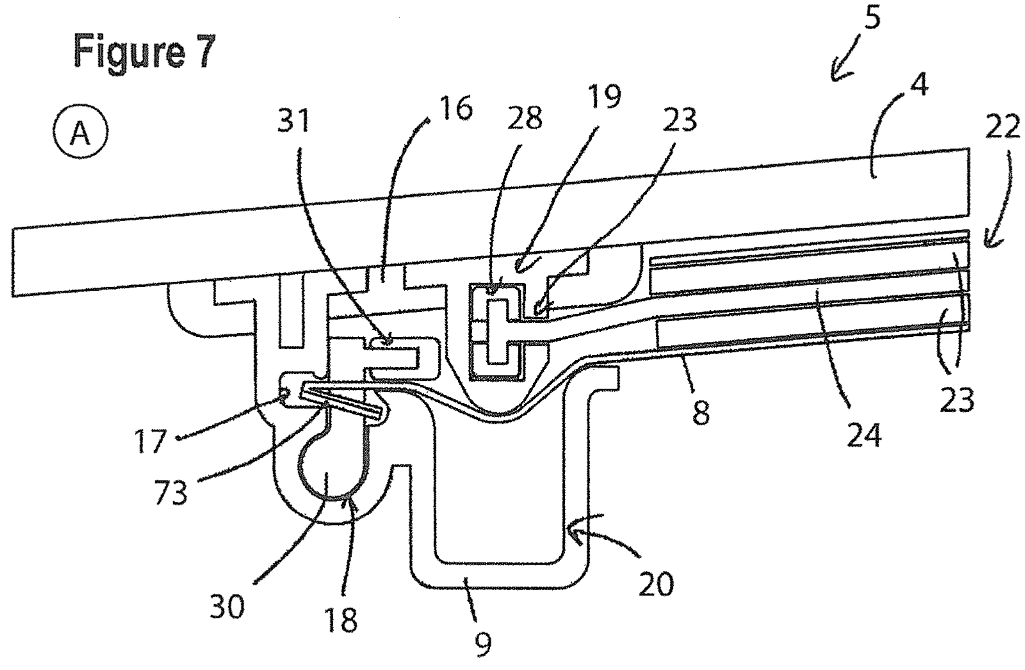
Figure 8:
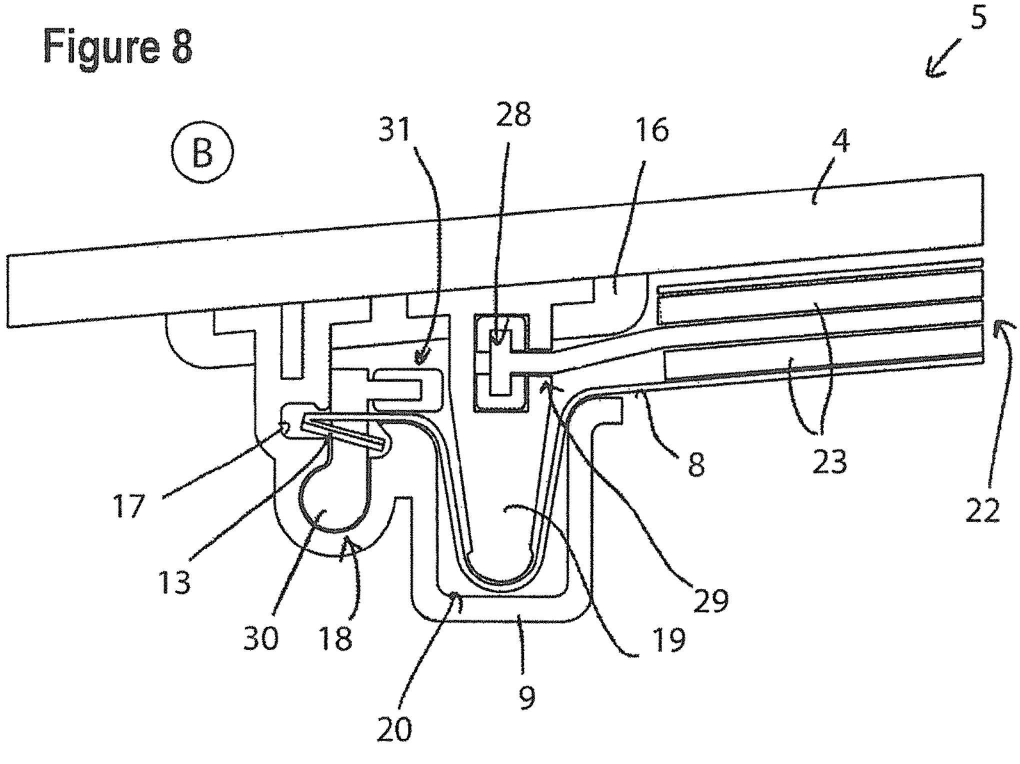

In the figures:

FIG. 1 shows a schematic top view of a vehicle roof,

FIG. 2 shows a schematic plan view of a roller blind arrangement of the vehicle roof, FIG. 3 shows a schematic sectional view of the roller blind arrangement according to an exemplary embodiment of the invention, FIG. 4 shows a schematic cross-section of the roller blind arrangement according to a further exemplary embodiment of the invention, FIGS. 5 and 6 show schematic cross-sections of a roller blind arrangement according to a further exemplary embodiment of the invention at two different longitudinal positions, and FIGS. 7 and 8 show schematic cross-sectional views of a roller blind arrangement according to a further exemplary embodiment at two different longitudinal positions.

DETAILED DESCRIPTION

FIG. 1 shows a vehicle 1, in particular a motor vehicle. The vehicle 1 has a vehicle roof 2. The vehicle roof has a roof opening 3 which is closed by a fixed glass element 4.

The fixed glass element is a transparent panoramic roof. The vehicle roof 2 has a roller blind arrangement 5 which is fixedly connected to the vehicle roof 2 or to the vehicle 1. The roller blind arrangement 5 has a winding arrangement 6 comprising a winding shaft 7 on which a roller blind web 8 is wound (indicated schematically in FIG. 1). The roller blind arrangement 5 has two mutually opposite guide rails 9 arranged on the two sides of the fixed glass element 4. The roller blind arrangement 8 is guided laterally displaceably in the guide rails 9. The winding arrangement 6 is configured such that the roller blind web 8 can be wound onto and unwound from the winding shaft 7. The guide rails 9 extend in the longitudinal direction 10. The roller blind web is wound up and unwound in the longitudinal direction 10. The longitudinal direction may also be described as the deployment direction of the roller blind 8.

Here and below, with a view to the coordinate system marked in FIG. 1, the deployment direction 10 runs in the X direction and hence in the vehicle longitudinal direction. The transverse direction corresponds to the Y direction. The roller blind web 8 thus extends in the X-Y plane. The height direction corresponds to the Z direction.

FIG. 2 shows schematically a plan view of the roller blind arrangement 5. The winding arrangement 6 with winding shaft 7, roller blind web 8 and guide rails 9, is depicted schematically for reasons of clarity. Here and below, as shown in FIGS. 2 and 1, the guide rails 9 are arranged non-parallel to one another, or do not run parallel to one another. In other words, the guide rails are curved in at least two dimensions and follow an outer roof contour 11 or an outer contour of the fixed glass element 4, in particular at the edge (see FIG. 1). The roller blind web 8 has a rectangular cross-section.

At opposite side edge regions 12, the roller blind web 8 has lateral guide elements 13 which are configured as lateral guide strips. The guide elements 13 extend in the X direction and are guided displaceably in the respective guide rails 9.

The roller blind arrangement 5 is configured such that the roller blind web 8 can be wound onto or unwound from the winding shaft 7. The roller blind web 8 is displaceably guided along the guide rails 9 by means of the guide elements 13 in corresponding guides. The roller blind web 8 extends between the guide rails 9, wherein depending on deployment state relative to the X direction (longitudinal direction 10), it extends to greater or lesser amounts over the entire length of the guide rails 9. The roller blind web 8 is under predefined tension the transverse direction (Y direction), as will be explained in more detail below.

One side of the roller blind arrangement 5 including fixed glass element 4 is described below with reference to multiple exemplary embodiments. It is pointed out that the other side, i.e. at the opposite guide rail 9, is configured accordingly. The following statements therefore apply similarly.

With a view to FIG. 2, it is clear that because of the non-parallel guide rails 9, at different positions along the longitudinal direction 10 (X direction), different distances are present between the guide rails 9. At a position A, a first distance 14 is larger then a second distance 19 at a position B, wherein position A is situated at an upper end of the guide rails 9 and position B approximately in the middle. Accordingly, a first overhang XA of the roller blind web 8 at the side edge region 12 is in each case smaller than a second overhang $X_B$ at position B. So that the roller blind web 8 can be adequately tensioned in predefined fashion in the transverse direction over the entire length of the guide rails 9 despite the non-parallel state of the guide rails 9, and can be wound up and unwound without problems, exemplary embodiments of the roller blind arrangements with fixed glass element 4 are described below which allow compensation for the described exemplary overhangs.

FIG. 3 shows a schematic sectional view of a roller blind arrangement 5 according to a first exemplary embodiment. The features described with reference to FIG. 2 apply similarly. For example, the section is taken at position B on the left guide rail 9 according to FIG. 2. This shows part of the roller blind arrangement 5 with fixed glass element 4. The guide rail 9 is foam-moulded onto an underside 15 of the fixed glass element 4 by means of foam moulding 16. The foam moulding is for example a PU-foam moulding (polyurethane). The guide rail 9 has a guide 17 in the form of a guide rail channel for the roller blind web 8. The guide rail 9 furthermore has a drive channel 18 in which a compression-resistant drive cable is displaceably guided, which is coupled to a motor for the drive (not shown). By means of the drive cable 18, by coupling with the roller blind web 8, the latter can be displaced in the X direction.

Furthermore, an insertion element 19 is foam-moulded onto the underside 15 of the fixed glass element 4. This is fixedly connected to the fixed glass element 4 by means of the same foam moulding 16 as the guide rail 9. The insertion element 19 is formed as a protrusion extending downward in the Z direction, such as a "blade". The insertion element 19 engages in a receiving channel 20 of the guide rail 9. The receiving channel 20 lies further inward on the guide rail 9 relative to the guide 17 or drive channel 18. The roller blind web 8 is guided between the receiving channel 20 and the insertion element 19. The roller blind web 8 in particular extends in the transverse direction, starting from the middle, outward along the receiving channel 20 and ends in the guide 17. In the Z direction (height direction), the insertion element 19 has an extent 21 (see double arrow) which could also be described as the length of the insertion element 19. The insertion element 19 extends along the receiving channel 20 along the guide rail 9.

The extent 21 varies in the longitudinal direction 10. In this exemplary embodiment, the insertion element 19 has a maximum extent 21 at the position B shown in FIG. 3, while the extent 21 is minimal at position A. Depending on the extent 21 of the insertion element, the roller blind web 8 must cover a greater or lesser distance inside the receiving channel 20 of the guide rail 9. Thus the above-mentioned transverse tension in the Y direction of the roller blind web can be ensured at every position along the guide rails. At position B in FIG. 2, the roller blind web substantially lines the receiving channel 20 over the full periphery, while at position A for example, significantly less roller blind web is received in the receiving channel 20.

The exemplary embodiment in FIG. 3 allows the above-mentioned advantages and functions.

FIG. 4 shows a further exemplary embodiment of the invention which substantially corresponds to the exemplary embodiment in FIG. 3, wherein again the basic principle described with reference to FIG. 2 applies. The difference is that the fixed glass element 4 is formed by two panes **4*a* and 4*b*, between which the roller blind web 8 is guided. With respect to the above-described compensation for spacing changes between the guide rails 9**, the statements made above apply accordingly.

The double-glazed structure allows the creation of an insulating glass system. Here, the roller blind web 8 is encapsulated between the two panes **4*a* and 4*b*. An encapsulation, e.g. sealed or vapour-tight, is provided at the side and front, such as in the form of frame or sealing elements. At the rear, for example, a removable frame part is provided with the roller blind arrangement 5, in particular the winding shaft 7** and a drive system. The double-glazing system can be completely closed by means of the removable frame part. Optionally, a sealing system or membrane is provided which can ensure pressure balancing.

FIGS. 5 and 6 show a further exemplary embodiment of the invention similar to FIG. 3, wherein FIG. 5 shows a sectional illustration of a corresponding roller blind arrangement 5 at position A, and FIG. 6 shows a sectional illustration of the roller blind arrangement 5 at position B. Reference is again made to the statements relating to FIG. 2. The statements relating to FIG. 3 apply substantially similarly. In FIGS. 5 and 6 again, a guide rail 9 and an insertion element 19 are connected to the fixed glass element 4 by means of a foam moulding 16. The guide rail 9 has a receiving channel 20.

According to FIG. 5, the insertion element 19 only has a slight extent 21, so that the roller blind web 8 runs substantially up to the guide 17 in the transverse direction between the insertion element 19 and receiving channel 20. Thus only little or no (equivalent to very little) roller blind web 8 is received in the receiving channel 20. At position B according to FIG. 6, however, the insertion element 19 has a maximum extent 21 so that a large amount of roller blind web 8 is received in the receiving channel 20.

The roller blind arrangement 5 according to FIGS. 5 and 6 has a tension bow 22. The tension bow 22 extends in the transverse direction at the front end 25 of the roller blind web 8 (see FIG. 2). The tension bow 22 has an elongate tension bow body 23 which is fixedly connected to the roller blind web 8 and extends between the guide rails 9, wherein at a longitudinal end 26 facing the guide rail 9, the tension bow body 23 has a guide element 24, by means of which the tension bow 22 is guided displaceably in the longitudinal direction in the guide rail 9, or in the guide 17 or a similar guide. For this, the guide element 24 optionally has a slider 27 at the outer end. The guide element 24 is for example a metal element such as a metal strip or steel strip. The guide element 24, or the slider 27, can be coupled to a drive for displacement of the tension bow 22 in the longitudinal direction (not shown).

The guide element 24 is arranged on the tension bow body 23 so as to be displaceable in the transverse direction between the guide rails 9. This is shown in FIGS. 5 and 6, where it is clear that the tension bow body 23 has been displaced along the guide element 24, closer to (FIG. 6) or further away from (FIG. 5) the insertion element 19. Thus the above-mentioned advantages and functions are achieved.

In the example of FIGS. 5 and 6, the guide element 24 of the tension bow 22 is guided in the guide rail 9 outside the insertion element 19. Here for example, it is guided around the insertion element 19 so as to line the inner wall of the receiving channel 20 and not obstruct the roller blind web 8 in its compensation for the fabric width.

FIGS. 7 and 8 show a further exemplary embodiment which substantially corresponds to the example described with reference to FIGS. 5 and 6. The difference is that the tension bow 22 is constructed differently. The guide element 24 is not guided directly displaceably in the respective guide rail 9, but comprises a magnetic element 28 and ends on the inside of the insertion element 19, or optionally—as in the exemplary embodiment—is guided displaceably in the insertion element 19. For this, the insertion element 19 has an opening 29 on the side which is open towards the middle. Corresponding to the magnetic element 28, a drive element 30 is provided which is guided displaceably in the drive channel 18. The drive element 30 is fixedly connected to the roller blind web 8, e.g. in the region of the guide element 13, at the level of the front end 26. The drive element 30 has a corresponding magnetic element 31 and is magnetically coupled to the magnetic element 28 of the tension bow 22. The drive element 30 is coupled to a drive, such as an electric motor, by means of a compression-resistant drive cable (not shown). By movement of the drive element 30, also the tension bow 22 is moved, and via this the roller blind web 8, i.e. wound onto or unwound from the winding shaft 7 and displaced along the guide rails 9 in order to cover or reveal the fixed glass element 4.

The invention claimed is:

1. A roller blind arrangement for a vehicle roof of a motor vehicle, having:

a fixed glass element, two mutually opposite guide rails which extend along a longitudinal direction and are each curved such that a distance between the guide rails changes along the longitudinal direction, a roller blind web which is displaceably guided in the guide rails along the longitudinal direction, wherein at least one of the guide rails has a receiving channel for receiving part of the roller blind web, an insertion element is arranged directly attached to the fixed glass element and extends along the receiving channel, the roller blind web is guided between the receiving channel and the insertion element, wherein the insertion element has an extent which changes in dimension along the longitudinal direction such that a greater or lesser amount of the roller blind web is received in the receiving channel, wherein the two guide rails run non-parallel to one another in the longitudinal direction, and wherein the insertion element is connected to the fixed glass element by foam moulding.

2. The roller blind arrangement according to claim 1, wherein a width of the insertion element in the receiving channel changes.

3. The roller blind arrangement according to claim 1, wherein the extent of the insertion element changes such that the insertion element engages in the receiving channel over different amounts along the corresponding guide rail.

4. The roller blind arrangement according to claim 1, wherein the guide rails together with the insertion element are connected to the fixed glass element by the foam moulding.

5. The roller blind arrangement according to claim 1, wherein the roller blind web has a rectangular shape.

6. The roller blind arrangement according to claim 1, having a tension bow with an elongate tension bow body which is fixedly connected to the roller blind web and extends between the guide rails, wherein at one longitudinal end, the tension bow body has a guide element, by which the tension bow is guided displaceably along the longitudinal direction, wherein the guide element is arranged on the tension bow body so as to be displaceable in a transverse direction between the guide rails.

7. The roller blind arrangement according to claim 6, wherein the guide element is displaceably guided in its respective guide rail and coupled to a drive.

8. The roller blind arrangement according to claim 6, wherein the guide element has a magnetic element which is magnetically coupled to a drive element which is displaceable in its respective guide rail.

9. A vehicle roof for a motor vehicle, having a roller blind arrangement according to claim 1, wherein the roller blind arrangement is fixedly connected to the vehicle roof.

* * * * *